US009095096B2

(12) United States Patent
Herron

(10) Patent No.: US 9,095,096 B2
(45) Date of Patent: Aug. 4, 2015

(54) UNIFORM DENSITY PACKER STUFFER SYSTEM

(75) Inventor: Maynard M. Herron, Hesston, KS (US)

(73) Assignee: AGCO Corporation, Duluth, GA (US)

(*) Notice: Subject to any disclaimer, the term of this patent is extended or adjusted under 35 U.S.C. 154(b) by 476 days.

(21) Appl. No.: 13/341,992

(22) Filed: Dec. 31, 2011

(65) Prior Publication Data

US 2012/0247348 A1    Oct. 4, 2012

Related U.S. Application Data

(60) Provisional application No. 61/428,877, filed on Dec. 31, 2010.

(51) Int. Cl.
*A01F 15/18* (2006.01)
*A01F 15/10* (2006.01)
*A01F 15/08* (2006.01)

(52) U.S. Cl.
CPC ........... *A01F 15/101* (2013.01); *A01F 15/0825* (2013.01); *A01F 2015/102* (2013.01)

(58) Field of Classification Search
CPC . B30B 9/301; A01F 15/101; A01F 2015/102; A01F 15/10
USPC ............ 100/45, 50, 188 R, 189, 215; 56/341, 56/344, 443; 198/474.1
See application file for complete search history.

(56) References Cited

U.S. PATENT DOCUMENTS

| | | | | |
|---|---|---|---|---|
| 1,073,744 A * | 9/1913 | Duncan | | 100/180 |
| 1,216,407 A * | 2/1917 | Bondurant | | 100/215 |
| 2,050,947 A * | 8/1936 | Harris | | 100/220 |
| 2,552,888 A * | 5/1951 | Druetta | | 100/189 |
| 2,941,679 A * | 6/1960 | Miller | | 414/528 |
| 4,126,089 A * | 11/1978 | Oosterling et al. | | 100/250 |
| 4,132,164 A * | 1/1979 | White | | 100/189 |
| 5,092,114 A * | 3/1992 | Eggenmueller | | 56/341 |
| 5,456,075 A * | 10/1995 | Meijer | | 56/341 |
| 5,752,374 A * | 5/1998 | Allworden et al. | | 56/341 |
| 7,140,170 B2 * | 11/2006 | Krone et al. | | 56/341 |
| 7,404,284 B2 * | 7/2008 | Viaud et al. | | 56/341 |
| 2006/0154791 A1* | 7/2006 | Reuteler et al. | | 493/70 |
| 2012/0179338 A1* | 7/2012 | Dresher | | 701/50 |
| 2012/0186465 A1* | 7/2012 | Dresher | | 100/35 |
| 2012/0221213 A1* | 8/2012 | Seeger | | 701/50 |
| 2013/0167739 A1* | 7/2013 | Herron | | 100/35 |

FOREIGN PATENT DOCUMENTS

WO    WO2013/124227    *    8/2013    .............. A01F 15/10

* cited by examiner

*Primary Examiner* — Shelley Self
*Assistant Examiner* — Leonel Vasquez

(57) ABSTRACT

In one embodiment, a stuffer method of a baler, the method comprising conveying with a plurality of pivotally-biased elements coupled along a moveable link a first portion of crop material from an inlet of a stuffer chute to a location proximal to an outlet of the stuffer chute; and responsive to a crop material density of the first portion meeting or exceeding a first predefined threshold density, conveying with a subset of the plurality of pivotally-biased elements a subsequent portion or portions of crop material from the inlet to the first portion until the subsequent portion or portions meets or exceeds a second predefined threshold density that substantially equals the first predefined threshold density.

16 Claims, 3 Drawing Sheets

UNIFORM DENSITY PACKER STUFFER SYSTEM

RELATED APPLICATION

Under provisions of 35 U.S.C. §119(e), Applicant claims the benefit of U.S. provisional application No. 61/428,877, filed Dec. 31, 2010, which is incorporated herein by reference.

TECHNICAL FIELD

The present disclosure generally relates to a baler, and in particular, a stuffer system of the baler.

BACKGROUND

Baling operations can follow combine harvester operations or windrow operations. In the former instance, a baler may be towed by a combine harvester or by a tractor to gather cut crops such as plant stalks from a field to form the plant stalks into round or square bales. Biomass fuels such as straw, hay, or cereals may be formed into bales. In the latter instance, a baler may pick up windrows that were created by a mower-conditioner.

SUMMARY

In one embodiment, a stuffer method of a baler, the method comprising conveying with a plurality of pivotally-biased elements coupled along a moveable link a first portion of crop material from an inlet of a stuffer chute to a location proximal to an outlet of the stuffer chute; and responsive to a crop material density of the first portion meeting or exceeding a first predefined threshold density, conveying with a subset of the plurality of pivotally-biased elements a subsequent portion or portions of crop material from the inlet to the first portion until the subsequent portion or portions meets or exceeds a second predefined threshold density that substantially equals the first predefined threshold density.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
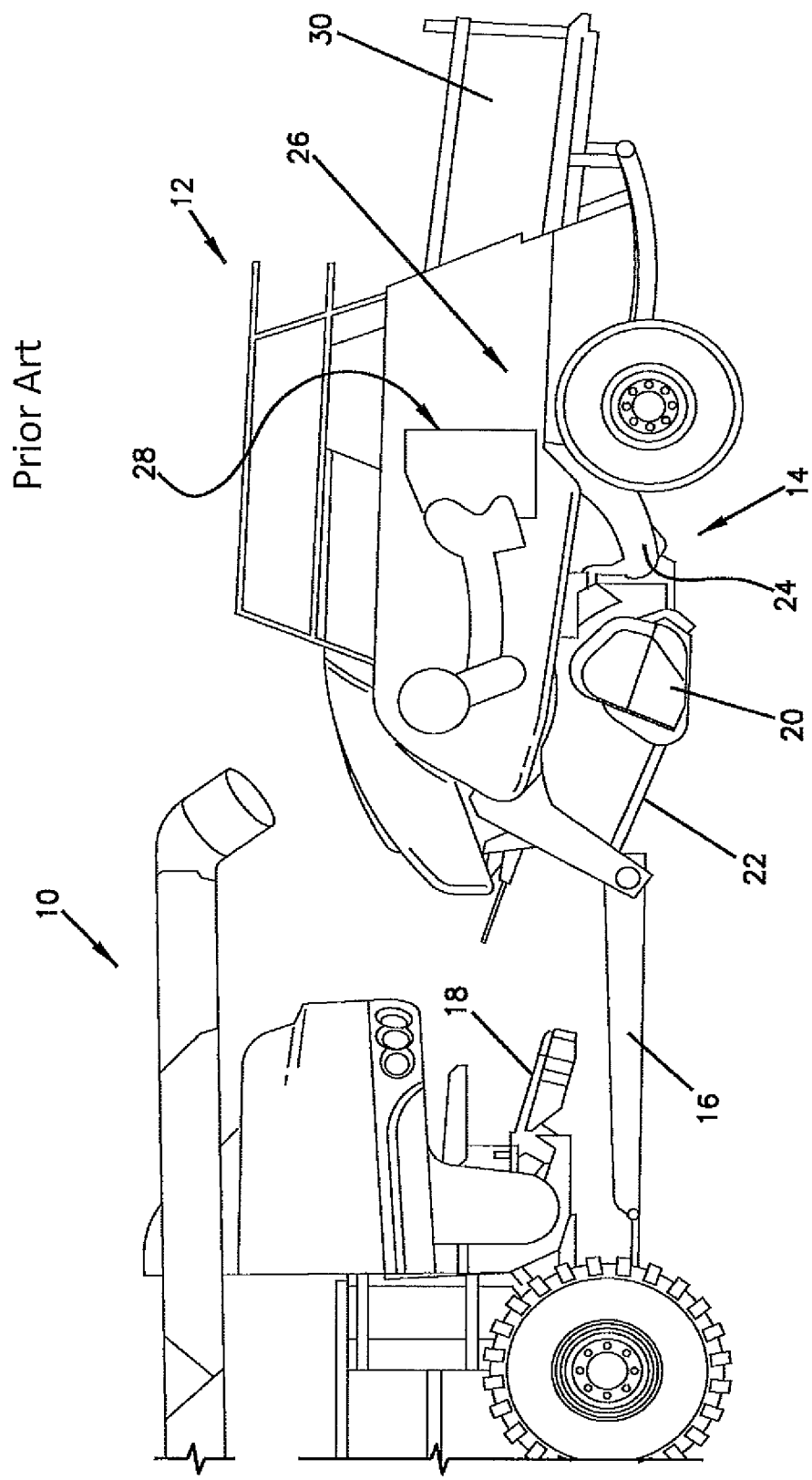
FIG. 1 is a schematic diagram of an example baler, towed by a combine harvester, in which an embodiment of a uniform density packer stuffer system may be employed.

Certain embodiments of a uniform density packer stuffer system and associated method are disclosed. The uniform density packer stuffer system (herein, also referred to as a stuffer system) comprises a conveyor assembly that has pivotally-biased elements coupled to a moving, endless link (e.g., chain). The elements extend into a stuffer chute and actively advance crop material to the upper portions of the stuffer chute. When the density of the advanced crop material reaches a predetermined level, the conveying elements adjacent the advanced crop material retract or otherwise cease to convey the crop material while conveying elements lower than the retracted conveying elements continue to advance additional crop material until a predetermined density is achieved. When the additional advanced crop material reaches the predetermined density, the adjacent elements retract (e.g., cease to convey) while lower elements continue to advance additional crop material, and the aforementioned process continues until the stuffer chute is filled with crop material with a uniform or near uniform top-to-bottom density, resulting in a uniform or near uniform density flake, thus increasing the flake and bale density.

Compared to conventional systems that rely on a passive advancement of the crop material (due to influx of crop material from a packer, for instance) up the stuffer chute (and possibly the retreat of the crop material to the lower sections of the stuffer chute triggering premature stuffer arm assembly actuation), certain embodiments of the stuffer systems disclosed herein actively and continually advance, via a mechanical system, the crop material to the upper portions of the stuffer chute until the stuffer chute fills up. In some embodiments, in addition to the uniform packing density features, conventional packing and stuffer assembly functionality is combined into the conveyor assembly functionality.

The following detailed description refers to the accompanying drawings. Wherever possible, the same reference numbers are used in the drawings and the following description to refer to the same or similar elements. While certain embodiments of the disclosure may be described, modifications, adaptations, and other implementations are possible as should be understood by one having ordinary skill in the art in the context of the disclosure. For example, substitutions, additions, or modifications may be made to the elements illustrated in the drawings, and the methods described herein may be modified by substituting, reordering, or adding stages to the disclosed methods. References hereinafter made to certain directions, such as, for example, "front", "rear", "left" and "right", are made as viewed from the rear of the baler looking forwardly.

Referring to FIG. 1, shown is an example combine harvester 10 (herein, also referred to as a combine) and baler 12 towed by the combine 10, the baler 12 housing certain embodiments of a stuffer system 14. It should be understood by one having ordinary skill in the art, in the context of the present disclosure, that the example components illustrated in FIG. 1 are merely illustrative, and should not be construed as implying any limitations upon the scope of the disclosure. For instance, in some embodiments, a tractor or other vehicle may be used to tow the baler 12, or in some embodiments, the baler 12 may be self-propelled. The baler 12 in the illustrated embodiment is pivotally attached to the rear of the combine 10 via a tongue 16, which is coupled to a hitch point located at the rear of the combine 10. As is known, the baler 12 may be powered by a hydrostatic motor affixed to a flywheel of the baler 12 drawing its power source from an engine of the combine 10 via, for instance, a hydrostatic pump.

In some implementations, the tongue 16 may be coupled to the combine 10 in a manner that enables crop material from the combine 10 to be transferred from the combine 10 directly to the baler 12 without redirection through the air by the combine 10 and without the use of a conveyor (or other transfer mechanism) coupled to either the combine 10 or the baler 12. For instance, the combine 10 may disburse crop material from a tailboard 18 at an angle of trajectory that enables the crop material to fall onto a component (e.g., pan) of the baler 12, the crop material then transferred to a pickup 20 of the baler 12 via a transfer pan 22. In some embodiments, other mechanisms of crop pickup may be used. For instance, the crop material may be lifted or received from the ground with the pickup 20. The pickup 20 may be a rotating drum-type mechanism with flexible tines or teeth for lifting and conveying crop material from the ground to the baler 12. In one embodiment, the stuffer system 14 grabs the crop material collected on the transfer pan 22 (or in some embodiments, from intermediary packing forks (not shown)) and moves the crop material back to a stuffer chute 24 (also known as a pre-compression chamber or pre-charge chamber).

As explained in further detail below, the stuffer system 14 comprises a conveyor assembly that actively and continuously moves repeated charges or flakes of crop material through the stuffer chute 24 until the stuffer chute is full, and then either alone, or in some embodiments, in cooperation with a stuffer arm assembly, transfers the accumulated charges past a top, retractable opening of the stuffer chute 24 to a bale chamber 26. The charge or charges are further compressed by a reciprocating plunger 28 (shown in a fragmentary view via a partial cut-away of the baler 12) in cooperation with adjustable baling doors and knotted in the baling chamber 26 for subsequent discharge of a bale 30 from the rear of the baler 12. As the pickup and plunging operations are known to those having ordinary skill in the art, discussion of the same are omitted hereinafter for brevity.

Figure 2:
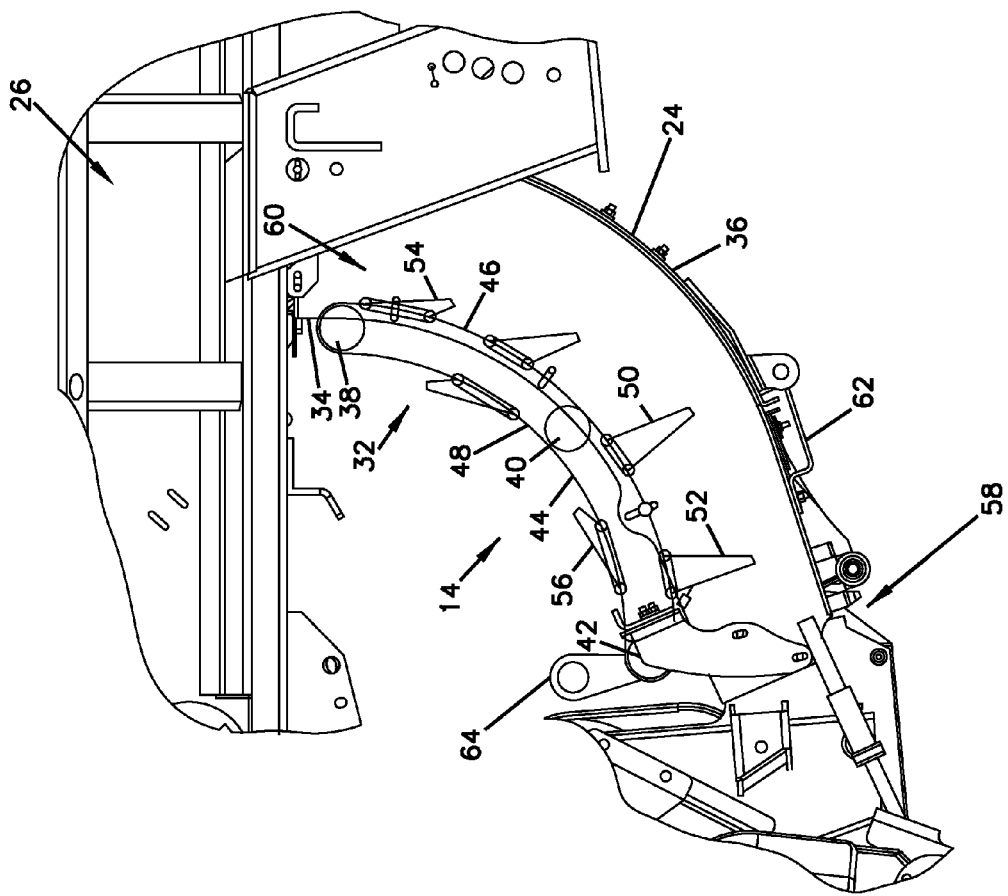
FIG. 2 is a side elevation view of an embodiment of a uniform density packer stuffer system.

Having described an example system and/or environment in which a stuffer system 14 may be employed, attention is now directed to FIG. 2, which illustrates one embodiment of a stuffer system 14. It should be understood by one having ordinary skill in the art, in the context of the present disclosure, that the example components illustrated in FIG. 2 are merely illustrative, and should not be construed as implying any limitations upon the scope of the disclosure. For instance, some components and/or structure are omitted from FIG. 2 where either well-known or detailed in association with later-described figures, and some components are illustrated in part, to avoid unduly complicating the drawing. The stuffer system 14 comprises a conveyor assembly 32. In one embodiment, the conveyor assembly 32 is associated (e.g., moveably attached or coupled) with an upper side 34 of the stuffer chute 24. In some embodiments, the conveyor assembly 32 may be associated with a lower side 36 of the stuffer chute 24. The conveyor assembly 32 comprises plural rollers, such as rollers 38, 40, and 42. In some embodiments, fewer or more rollers may be used. In some embodiments, rollers 38, 40, and 42 may extend across the entire width of the stuffer chute 24. In some embodiments, individual sets of rollers (a set of, for instance, three rollers mirroring rollers 38, 40, and 42) in addition to rollers 38, 40, and 42 may be distributed across all or a portion (e.g., only the opposing side) of the entire width of the stuffer chute 24. In one embodiments, one of the rollers (e.g., roller 42) may be coupled to a drive mechanism actuated for rotational motion via a motive force (e.g., electric motor, or hydraulic or mechanical motive force), whereas the rest of the rollers (e.g., rollers 38, 40) may be idler or free-spinning rollers. In some embodiments, additional and/or different rollers may be actuated, either by a dedicated motive force or driven via the motive force driving roller 42 (or driving other rollers in some embodiments) via a suitable coupling arrangement.

The conveyor assembly 32 further comprises an endless link 44 (e.g., chain, or in some embodiments, a synthetic belt or band) that moves over each of the rollers 38, 40, and 42. In some embodiments, additional links, the same or similar to link 44, may be distributed across all or a portion of the width of the stuffer chute 24. As the link 44 moves over rollers 38, 40, and 42, at a given snap-shot in time during engagement with crop material located within stuffer chute 24, a portion 46 of the link 44 may be located within the stuffer chute 24 (and adjacent the crop material) whereas another portion 48 of the link 44 may be located outside of the stuffer chute 24. In some embodiments, both portions 46 and 48 may be located within the stuffer chute 24 during engagement with the crop material.

The link 44 further comprises pivotally-biased elements 50 coupled to and along the length of the link 44. In one embodiment, the elements 50 may comprise haydogs (e.g., microhaydogs) having a predominantly triangular geometry, though in some embodiments, other geometries may be employed. The elements 50 are configured to transition between a fully-extended configuration and a retracted configuration, such as based on a sensed density or load corresponding to the crop material in the stuffer chute 24. For instance, elements 50 and 52 are fully extended to engage and actively transport (e.g., convey) crop material within the stuffer chute 24. In contrast, element 54 is in a fully retracted configuration, such as when crop material is located in an upper portion of the stuffer chute 24 and the crop material proximal to the retracted element has achieved a predetermined target density. Similarly, element 56 is in a retracted configuration in a return path of the link 44, as are other elements in the return path. Assuming the presence of crop material (not shown) in the upper portion of the stuffer chute 24 that has a corresponding density that meets or exceeds a predetermined threshold or target density, the element 54 is responsively in a retracted configuration. Retraction of the element 54 may be signaled by a corresponding sensor located on the element 54 or on a surface of the stuffer chute 24, such as in a vicinity proximal to the element 54. Similarly, sensors may be located on one or more of the other elements 50 and/or in a vicinity proximal to all or a portion of each of the elements 50 (e.g., coupled to the interior surface of the stuffer chute 24 and distributed along length of the stuffer chute 24, spaced at defined intervals along the length and optionally the width of the stuffer chute 24). In some embodiments, a single sensor may be used.

The link 44 travels in a direction (e.g., counter-clockwise) that enables the elements 50 to engage and actively advance or transport the crop material continually from an inlet end 58 of the stuffer chute 24 to an outlet end 60 of the stuffer chute 24, causing packing of accumulated charges and hence increased density of the packed crop material. The outlet end 60 of the stuffer chute 24 is proximal to a bale chamber 26, and the flow of the crop material is temporarily obstructed from passing the outlet end 60 by known mechanisms, such as a retractable holding fork (not shown) extending into the stuffer chute 24. The link 44 travels along a return path that is located in one embodiment outside of the stuffer chute 24, with the elements 50 in the return path in a retracted configuration, as depicted by the element 56.

In operation, the elements 50 of the conveyor assembly 32 grab the crop material at the inlet end 58 of the stuffer chute 24. The link 44 travels along the rollers 38, 40, 42, and the elements 50 travel along with the link 44, transporting the engaged crop material up the stuffer chute 24. In an extended configuration, the elements 50 actively convey the crop material to the upper portion of the stuffer chute 24, and continue this process, packing the crop material until a predetermined threshold density has been reached. Responsive to the crop material density reaching or exceeding the target predetermined density (or upon entering the return path), the upper elements (e.g., element 54) is actuated to a retracted state, hence ceasing to convey the crop material any further. The lower elements 50, however, continue in the extended configuration (except in the return path) to pack the crop material up against the crop material having the reached or exceeded threshold density until reaching a predetermined threshold density of the first batch, resulting in the elements (e.g., the elements located between element 50 and element 54) being actuated to a retracted state. The crop material continues to be advanced up the stuffer chute 24, yet with a progressively decreasing amount of elements 50 in the extended configuration as the threshold density for each segment of the stuffer chute 24 is reached or exceeded. Note that in some embodiments, one or more of the elements 50 may be in an extended configuration in the return path. Responsive to the crop material completely or near completely filling the stuffer chute 24 (and at a uniform density or near uniform density from top-to-bottom), as sensed (at least in part) by the load sensor 62 located along the lower side 36 and proximal to the inlet end 58 of the stuffer chute 24, the holding fork at the outlet end 60 of the stuffer chute 24 is signaled to retract to enable the transfer of the crop material to the bale chamber 26. The continual packing and active advancement of the crop material helps to mitigate the risk of premature actuation of the load sensor 62 (e.g., from falling crop material causing erroneous sensing).

In one embodiment, transport of the crop material from the stuffer chute 24 to the bale chamber 26 is achieved through actuation of the elements 50 from the conveying mode previously described to a transfer mode (e.g., flake stuffer feeding mode). Such a control scheme may be employed via control circuitry such as a PLC, an ASIC or other semiconductor device, alone or in combination with a processor executing software or firmware stored in a tangible, non-transitory computer readable medium. In the transfer mode, the elements 50 adjacent the crop material (adjacent the portion 46) are in an extended configuration to enable the elements to function similar to a stuffer arm/fork assembly. A variable cam 64 (shown in part) is also actuated to enable the conveyor assembly 32 to extend further into the stuffer chute 24, somewhat similar to mechanisms employed on stuffer arm assemblies, and scoop the packed, crop material from the inlet end 58 past the outlet end 60 and into the bale chamber 26. Then, the control scheme causes a return to the conveying mode, resulting in the variable cam 64 returning the conveyor assembly 32 to the home or base position along the stuffer chute 24 shown in FIG. 2 (the conveying mode), and the previously described conveying process continues in similar manner.

In some embodiments, a different mechanism may be employed to transport the packed crop material from the stuffer chute 24 to the bale chamber 26. For instance, in one embodiment, the variable cam 64 may be omitted (or in some embodiments, used for a stuffer arm assembly), and the conveyor assembly 32 may be located along the lower side 36 of the stuffer chute 24. In such an embodiment, the conveyor assembly 32 may, as a whole, be retractable from the home or base position to move out of interference with an actuated stuffer arm assembly located proximal to the upper side 34 of the stuffer chute 24 and operable in known manner. In other words, the conveyor assembly 32 retreats from the base or home position, enabling the stuffer arm assembly (and fork) to extend into the stuffer chute 24 and scoop the packed crop material from the stuffer chute 24 to the bale chamber 26. In some embodiments, the locations of the conveyor assembly 32 and stuffer arm assembly may be switched, where the conveyor assembly 32 may be located along the upper side 34 of the stuffer chute 24 and the stuffer arm assembly may be located proximal to the lower side 36 of the stuffer chute 24, where the conveyor assembly 32 is moveable into and out of interference with the stuffer arm assembly and operation occurs in similar manner as described above. In some embodiments, a stuffer arm assembly and the conveyor assembly 32 may be located on the same side of the stuffer chute 24, whereby a pivoting mechanism enables the conveyor assembly 32 to be temporarily withdrawn out of interference with the stuffer arm assembly for the transfer operation.

It should be appreciated within the context of the present disclosure that some embodiments may omit certain features, and/or add more or use different features and/or arrangements of components. For instance, the control schemes for the different modes and/or extension and retraction of the elements 50 may be achieved locally, or via a control system as communicated over a network from a towing vehicle (e.g., combine 10). Such a control system may include such well-known components as switches, controllers, one or more processors, memory, and/or associated motive apparatuses (e.g., electronic, hydraulic, mechanical) as communicated over a network (e.g., wiring, buses, wireless, etc.). In some embodiments, control may be accomplished, at least in part, via pneumatic control.

Further, it should be understood by one having ordinary skill in the art, in the context of the present disclosure, that the example components illustrated in FIGS. 1-2 are merely illustrative, and should not be construed as implying any limitations upon the scope of the disclosure.

Figure 3:
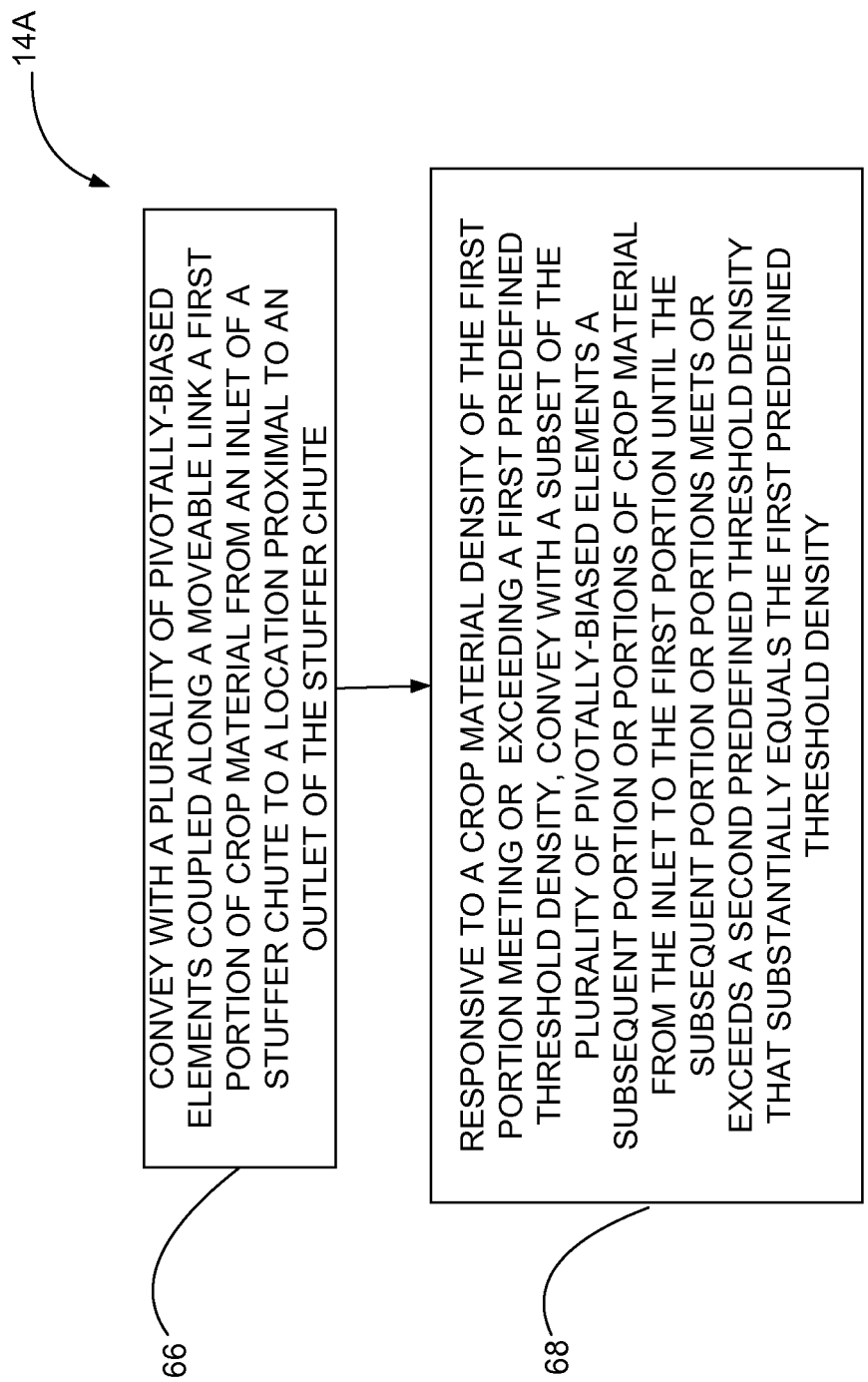
FIG. 3 is a flow diagram that illustrates an embodiment of an example stuffer method.

Having described certain embodiments of the stuffer system 14, it should be appreciated, in the context of the present disclosure, that one embodiment of a stuffer method 14A, illustrated in FIG. 3, comprises conveying with a plurality of pivotally-biased elements coupled along a moveable link a first portion of crop material from an inlet of a stuffer chute to a location proximal to an outlet of the stuffer chute (66); and responsive to a crop material density of the first portion meeting or exceeding a first predefined threshold density, conveying with a subset of the plurality of pivotally-biased elements a subsequent portion or portions of crop material from the inlet to the first portion until the subsequent portion or portions meets or exceeds a second predefined threshold density that substantially equals the first predefined threshold density (68).

It should be emphasized that the above-described embodiments of the present disclosure are merely possible examples of implementations, merely set forth for a clear understanding of the principles of the stuffer system and method embodiments. Many variations and modifications may be made to the above-described embodiment(s) without departing substantially from the spirit and principles of the disclosure. Although all such modifications and variations are intended to be included herein within the scope of this disclosure and protected by the following claims, the following claims are not necessarily limited to the particular embodiments set out in the description.

What is claimed is:

1. A stuffer system of a baler, comprising:
    a stuffer chute having an inlet end and an outlet end, the outlet end proximal to a bale chamber; and
    a conveyor assembly disposed along the stuffer chute, the conveyor assembly comprising pivotally-biased elements coupled along a moveable link, wherein elements on a portion of the link disposed within the stuffer chute are pivotable between a retracted position and an extended position, wherein the conveyor assembly is switchable between a conveying mode and a transfer mode, wherein the conveying mode has the movable link operate in a base position along the stuffer chute such that the conveying mode comprises conveyor assembly operations corresponding to filling the stuffer chute between the inlet end and the outlet end with crop material, wherein the transfer mode comprises transferring the crop material from the stuffer chute to the bale chamber by moving at least a portion of the link positioned at the inlet end into a transfer position, wherein the elements extend further into the stuffer chute when the link is in the transfer position than when the link is in the base position, and wherein each element pivots to the element's retracted position when crop material proximal the element reaches a predetermined density and the conveyor assembly is in the conveying mode, and each element pivots to or remains in the element's extended position when the conveyor assembly is in the transfer mode.

2. The system of claim 1 wherein a portion of the link disposed outside of the stuffer chute comprises the elements arranged in the retracted position.

3. The system of claim 1, wherein the portion disposed within the stuffer chute comprises a first plurality of the elements arranged in an extended position and a second plurality of the elements arranged in a retracted position.

4. The system of claim 3, wherein the first plurality of the elements are adjacent crop material located in the stuffer chute, the crop material having a density below a predefined threshold density.

5. The system of claim 3, wherein the second plurality of the elements are adjacent crop material located in the stuffer chute, the crop material having a density that meets or exceeds a predefined threshold density.

6. The system of claim 1, wherein the portion of the link disposed outside of the stuffer chute comprises a return path and the portion of the link disposed within the stuffer chute comprises a crop material engaging path.

7. The system of claim 1, wherein the link comprises a chain.

8. The system of claim 1, further comprising a variable cam operably coupled to the conveyor assembly to cause the link to move to the transfer position such that the conveyor assembly operates in the transfer mode to transfer the crop material from the stuffer chute to the bale chamber.

9. A stuffer method of a baler, the method comprising:
conveying with a plurality of pivotally-biased elements coupled along a moveable link a first portion of crop material from an inlet of a stuffer chute to a location proximal to an outlet of the stuffer chute; and
responsive to a crop material density of the first portion meeting or exceeding a first predefined threshold density, pivoting each pivotally-biased element to the element's retracted position when crop material proximal the element reaches the predefined threshold density and conveying with a subset of the plurality of pivotally-biased elements a subsequent portion or portions of crop material from the inlet to the first portion until the subsequent portion or portions meets or exceeds a second predefined threshold density that substantially equals the first predefined threshold density; and
moving at least a portion of the link positioned at the inlet of the stuffer chute into a transfer position, wherein the elements pivot to their extended position and extend further into the stuffer chute when the link is in the transfer position than when the link is in a base position to transfer the crop material out of the stuffer chute.

10. A stuffer system of a baler, comprising:
a stuffer chute having an inlet end and an outlet end, the outlet end proximal to a bale chamber; and
a conveyor assembly disposed along the stuffer chute, the conveyor assembly comprising pivotally-biased elements coupled along a moveable link, wherein elements on a portion of the link disposed within the stuffer chute are pivotable between a retracted position and an extended position, wherein the conveyor assembly is switchable between a conveying mode and a transfer mode, wherein the conveying mode has the movable link operate in a base position along the stuffer chute such that the conveying mode comprises conveyor assembly operations corresponding to filling the stuffer chute between the inlet end and the outlet end with crop material, wherein the transfer mode comprises transferring the crop material from the stuffer chute to the bale chamber by moving at least a portion of the link positioned at the inlet end into a transfer position, and wherein each element pivots to the element's retracted position when crop material proximal the element reaches a predetermined density and the conveyor assembly is in the conveying mode, and each element pivots to or remains in the element's extended position when the conveyor assembly is in the transfer mode.

11. The system of claim 10, further comprising a variable cam operably coupled to the conveyor assembly to cause the link to move to the transfer position such that the conveyor assembly operates in the transfer mode to transfer the crop material from the stuffer chute to the bale chamber.

12. The system of claim 10, wherein the portion disposed within the stuffer chute comprises a first plurality of the elements arranged in an extended position and a second plurality of the elements arranged in a retracted position.

13. The system of claim 12, wherein the first plurality of the elements are adjacent crop material located in the stuffer chute, the crop material having a density below a predefined threshold density.

14. The system of claim 12, wherein the second plurality of the elements are adjacent crop material located in the stuffer chute, the crop material having a density that meets or exceeds a predefined threshold density.

15. The system of claim 12, wherein the portion of the link disposed outside of the stuffer chute comprises a return path and the portion of the link disposed within the stuffer chute comprises a crop material engaging path.

16. The system of claim 10, wherein the link comprises a chain.

* * * * *